United States Patent
Sem Siev et al.

(10) Patent No.: US 11,025,669 B2
(45) Date of Patent: *Jun. 1, 2021

(54) DETECTION AND PREVENTION OF AUTOMATIC REDIRECTS OF MAIN HTML DOCUMENT FROM WITHIN NESTED SUB-DOCUMENT

(71) Applicant: Five Media Marketing Limited, Nicosia (CY)

(72) Inventors: Amnon Sem Siev, Hod HaSharon (IL); Daniel Maman, Kiryat Tivon (IL); Adi Zlotkin, Kfar Ruth (IL); Ido Peled, Tel Mond (IL); Yehuda Sapir, Eli (IL)

(73) Assignee: FIVE MEDIA MARKETING LIMITED, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,425

(22) Filed: Jan. 31, 2019

(65) Prior Publication Data

US 2020/0059488 A1    Feb. 20, 2020

Related U.S. Application Data

(63) Continuation of application No. 16/104,463, filed on Aug. 17, 2018, now Pat. No. 10,205,749.

(51) Int. Cl.
    *H04L 29/06* (2006.01)
(52) U.S. Cl.
    CPC .................. *H04L 63/1466* (2013.01)
(58) Field of Classification Search
    CPC .................................................. H04L 63/1466
    See application file for complete search history.

(56) References Cited

U.S. PATENT DOCUMENTS

| | | | |
|---|---|---|---|
| 7,000,183 B1 * | 2/2006 | Crawford, Jr. | G06F 16/26 715/202 |
| 7,287,089 B1 * | 10/2007 | Lamoureux | G06Q 30/06 709/204 |

(Continued)

FOREIGN PATENT DOCUMENTS

| CN | 103559446 A | 2/2014 |
|---|---|---|
| CN | 104199934 B | 7/2017 |

OTHER PUBLICATIONS

IAB Technology Lab, "OpenRTB Specification v3.0," (Nov. 2018), available online at https://github.com/InteractiveAdvertisingBureau/openrtb/blob/master/OpenRTB%20v3.0%20FINAL.md.

(Continued)

*Primary Examiner* — Bradley W Holder
(74) *Attorney, Agent, or Firm* — The Roy Gross Law Firm, LLC; Roy Gross

(57) ABSTRACT

A method comprising: receiving, from a web browser, a request for content to be inserted into a sub-document that is nested inside a main document; and transmitting to said web browser, in response to the request: said content, and a client-side script that, when inserted by said web browser into said sub-document: (i) listens to software methods that attempt to invoke a user event without an action by a user of said web browser, (ii) analyzes said user event to determine if said user event is configured to cause said web browser to navigate away from said main document.

21 Claims, 3 Drawing Sheets

(56) References Cited

U.S. PATENT DOCUMENTS

| | | | |
|---|---|---|---|
| 7,451,321 B2* | 11/2008 | Dryer | G06F 40/166 713/177 |
| 7,917,755 B1* | 3/2011 | Giliyaru | G06F 40/194 713/169 |
| 8,516,590 B1* | 8/2013 | Ranadive | H04L 63/1483 726/24 |
| 8,555,391 B1 | 10/2013 | Demir et al. | |
| 9,027,140 B1 | 5/2015 | Watkins et al. | |
| 9,509,714 B2 | 11/2016 | Sivan et al. | |
| 10,205,749 B1 | 2/2019 | Sem Siev et al. | |
| 10,320,816 B1 | 6/2019 | Smith | |
| 2005/0076215 A1* | 4/2005 | Dryer | G06F 40/166 713/170 |
| 2010/0306344 A1* | 12/2010 | Athas | G06F 16/957 709/219 |
| 2011/0019853 A1 | 1/2011 | Chang | |
| 2011/0219448 A1 | 9/2011 | Sreedharan et al. | |
| 2012/0296713 A1 | 11/2012 | Abdulhayoglu | |
| 2013/0080867 A1* | 3/2013 | Vandervort | G06F 16/94 715/205 |
| 2013/0086255 A1* | 4/2013 | Burckart | H04L 67/42 709/224 |
| 2013/0160120 A1* | 6/2013 | Malaviya | G06Q 30/0244 726/23 |
| 2014/0040394 A1 | 2/2014 | Tang et al. | |
| 2014/0067538 A1 | 3/2014 | Hook et al. | |
| 2015/0371040 A1 | 12/2015 | Ding et al. | |
| 2016/0063572 A1 | 3/2016 | Brown et al. | |
| 2016/0088015 A1* | 3/2016 | Sivan | H04L 29/08 726/23 |
| 2016/0261623 A1 | 9/2016 | McClintock et al. | |
| 2017/0243238 A1 | 8/2017 | Kosai et al. | |
| 2017/0243243 A1 | 8/2017 | Kosai et al. | |
| 2018/0332076 A1 | 11/2018 | Callahan et al. | |

OTHER PUBLICATIONS

XIOS: Extended Application Sand-boxing on IOS Bucicoiu et al ACM (Year: 2015).

Reliable Third-Party Library Detection in Android and its Security applications. Backes et al ACM (Year: 2016).

Geoedge blocking malware offensive ads webpage (Year: 2018).

Geoedge Operation Fingerprint (Year: 2018).

Y. Yuan et al, "A survey on real time bidding advertising", IEEE 2014.

C. Dwyer et al, "A Rising Threat to the Online Ecosystem", Journal of Information Systems Applied Research, Dec. 2017, vol. 10 Issue 3.

Marco Balduzzi et al., "A Solution for the Automated Detection of Clickjacking Attacks", ASIACCS '10 Proceedings of the 5th ACM Symposium on Information, Computer and Communications Security, Apr. 13-16, 2010, Beijing, China, pp. 135-144.

Gustav Rydstedt et al., "Busting Frame Busting: a Study of Clickjacking Vulnerabilities on Popular Sites", IEEE Oakland Web 2.0 Security and Privacy (W2SP), 9 pages, 2010.

Jawwad A. Shamsi et al., "Clicksafe: Providing Security Against Clickjacking Attacks", 2014 IEEE 15th International Symposium on High-Assurance Systems Engineering, p. 206-210, Jan. 9-11, 2014.

How to protect yourself from rogue redirect ads right now in Chrome, <https://www.androidpolice.com/2017/11/08/heres-protect-rogue-redirect-ads-right-now-chrome/>, retrieved May 22, 2018.

Frame-buster-killer, <https://github.com/quafzi/iframe-buster-killer/blob/master/iframe-buster-killer.js>, retrieved May 22, 2018.

Frame Buster Buster . . . buster code needed, <https://stackoverflow.com/questions/958997/frame-buster-buster-buster-code-needed>, retrieved May 22, 2018.

Stop redirect from iframe | Warrior Forum—The #1 Digital Marketing Forum & Marketplace, <https://www.warriorforum.com/website-design/429413-stop-redirect-iframe.html>, retrieved May 22, 2018.

What is safe Frame or Safe Frame Container ?, <http://adtagmacros.com/what-is-safe-frame-safe-frame-container/>, retrieved May 22, 2018.

How to prevent IFrame from redirecting top-level window, <https://stackoverflow.com/questions/369498/how-to-prevent-iframe-from-redirecting-top-level-window>, retrieved Oct. 2, 2018.

Is there a way to prevent an iframe from redirecting parent window, but in such a way that "top level" redirects still work inside the iframe itself?, <https://stackoverflow.com/questions/25958241/is-there-a-way-to-prevent-an-iframe-from-redirecting-parent-window-but-in-such>, retrieved Oct. 2, 2018.

Unknown author; "HTML standard of the WC3.pdf"; Retrived from the Internet on Jul. 20, 2018.

Unknown author; "Hypertext Transfer Protocol—HTTP/1.1"; Retrieved from the Internet on Jul. 20, 2018.

Unknown author; "ECMAScript 2018 Language Specification.pdf"; Retrived from the Internet on Jul. 20, 2018.

Wang et al.; Discovering typical structures of documents: a road map approach; Published in: Proceeding SIGIR '98 Proceedings of the 21st annual international ACM SIGIR conference on Research and development in information retrieval; Melbourne, Australia— Aug. 24-28, 1998; ACM Digital Library.

Saadi et al.; Morph Digital Signature a New Signature Framework fore-Documents in Pervasive Environments; Published in: IEEE International Conference on Pervasive Services; Date of Conference: Jul. 15-20, 2007; IEEE Xplore (Year: 2007).

Li, et al., "Knowing your Enemy: Understanding and Detecting Malicious Web Advertising", Proceedings of the 2012 ACM conference on Computer and communications security, (pp. 674-686) (2012).

Dwyer, et al., "Gone in 200 Milliseconds: The Challenge of Blocking Malvertising",Student and Faculty Research Days, (2016).

Fielding et al., Hypertext Transfer Protocol—HTTP/1.1 [online: https://tools.ietf.org/html/rfc2616]; Jun. 1999 [retrieved Jul. 20, 2018].

The World Wide Web Consortium (W3C), Hypertext Markup Language (HTML) standard [online: https://www.w3.org/standards/techs/html#completed]; Unknown publication date [retrieved Jul. 20, 2018].

Ecma International, Standard ECMA-262: ECMAScript® 2018 Language Specification, 9th edition [online: https://www.ecma-international.org/publications/standards/Ecma-262.htm]; Jun. 2018 [retrieved Jul. 20, 2018].

\* cited by examiner

US 11,025,669 B2

DETECTION AND PREVENTION OF AUTOMATIC REDIRECTS OF MAIN HTML DOCUMENT FROM WITHIN NESTED SUB-DOCUMENT

CROSS-REFERENCE TO RELATED APPLICATIONS

This application is a continuation of U.S. patent application Ser. No. 16/104,463, filed Aug. 17, 2018, entitled "Detection and Prevention of Automatic Redirects of Main HTML Document from Within Nested Sub-Document."

BACKGROUND

The invention relates to the field of Internet security.

Internet visitor traffic is an expensive commodity. Advertisers, Internet marketers, and other players all compete on gaining visitor attention, which can later be translated into monetary profits. These players profit from visitors clicking on advertisements, filling in "business lead" forms, downloading software, etc.

Some malicious players opt to illegitimately direct Internet users to their own content, by redirecting them, without their knowledge, to these players' own resources—web sites, software download links, and the like.

Such illegitimate attacks oftentimes involve sophisticated HTML and/or javascript programming, that causes the visitor's web browser to redirect to the attacker's desired resource without any intentional action by the visitor. This is true both for regular desktop web browsers, as well as browsers embedded in software applications ("apps") on mobile devices, where they are used to fetch external contents such as advertisements displayed next to the regular content of the app.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

Provided herein, in accordance with an embodiment, is a method comprising: receiving, from a web browser, a request for content to be inserted into a sub-document that is nested inside a main document; and transmitting to said web browser, in response to the request: (a) said content, and (b) a client-side script that, when inserted by said web browser into said sub-document: (i) listens to software methods that attempt to invoke a user event without an action by a user of said web browser, (ii) analyzes said user event to determine if said user event is configured to cause said web browser to navigate away from said main document.

In some embodiments, each of said main document and said sub-document is an HTML (HyperText Markup Language) web page, and said sub-document is nested inside an iframe of said main document.

In some embodiments, said main document is regarded by said browser as a "_top" document, and the navigation away from said main document comprises said user event instructing said web browser to navigate to a URL (Uniform Resource Locator) that is different from the URL currently presented as the "_top" document.

In some embodiments, said software methods comprise "HTMLElement.prototype.click", "EventTarget.prototype.dispatchEvent", "HTMLFormElement.prototype.submit", an "Event( )" constructor, "fireEvent( )", "document.createEvent", "Event.initEvent( )", "MouseEvent", and/or "UIEvent".

In some embodiments, said user event is determined to be configured to cause said web browser to navigate away from said main document, if: said user event is "document.createEvent".

In some embodiments, said user event is determined to be configured to cause said web browser to navigate away from said main document, if: said user event is "Event.initEvent", said user event comprises use of an "Event( )" constructor to create a new event, and/or said user event comprises a registration of a new event listener.

In some embodiments, said new event listener is "EventTarget.addEventListener", "attachEvent( )", and/or "captureEvents( )".

In some embodiments, the client-side script is a javascript.

In some embodiments, the method further comprises, in response to a determination that said user event is configured to cause said web browser to navigate away from said main document: preventing said user event from causing said web browser to navigate away from said main document.

In some embodiments, said preventing is performed by said client-side script.

In some embodiments, said client-side script further transmits said determination to a server, and receives an instruction from the server to perform said prevention.

In some embodiments, the method is performed in the framework of a computer program product comprising a non-transitory computer-readable storage medium having program code embodied therewith, the program code executable by at least one hardware processor to perform the method.

In some embodiments, the computer program product is part of a system that also comprises the at least one hardware processor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a technique, embodied in a method, a system, and a computer program product, for detecting, and optionally preventing, attempts to redirect a web browser away from a currently-displayed main document (e.g., an HTML "_top" document), which attempts originate from a sub-document (e.g., an "iframe") nested inside the main document.

The various technical terms used herein are intended to have the meaning prescribed in RFC 2616, "Hypertext Transfer Protocol—HTTP/1.1", this document is available on the world wide web, please see an accompanying IDS for the retrieval URL and retrieval date;

in the Hypertext Markup Language (HTML) standard of The World Wide Web Consortium (W3C), this document is available on the world wide web, please see an accompanying IDS for the retrieval URL and retrieval date;

and in the Standard ECMA-262, "ECMAScript® 2018 Language Specification", also known as the javascript standard, this document is available on the world wide web, please see an accompanying IDS for the retrieval URL and retrieval date.

Figure 1:
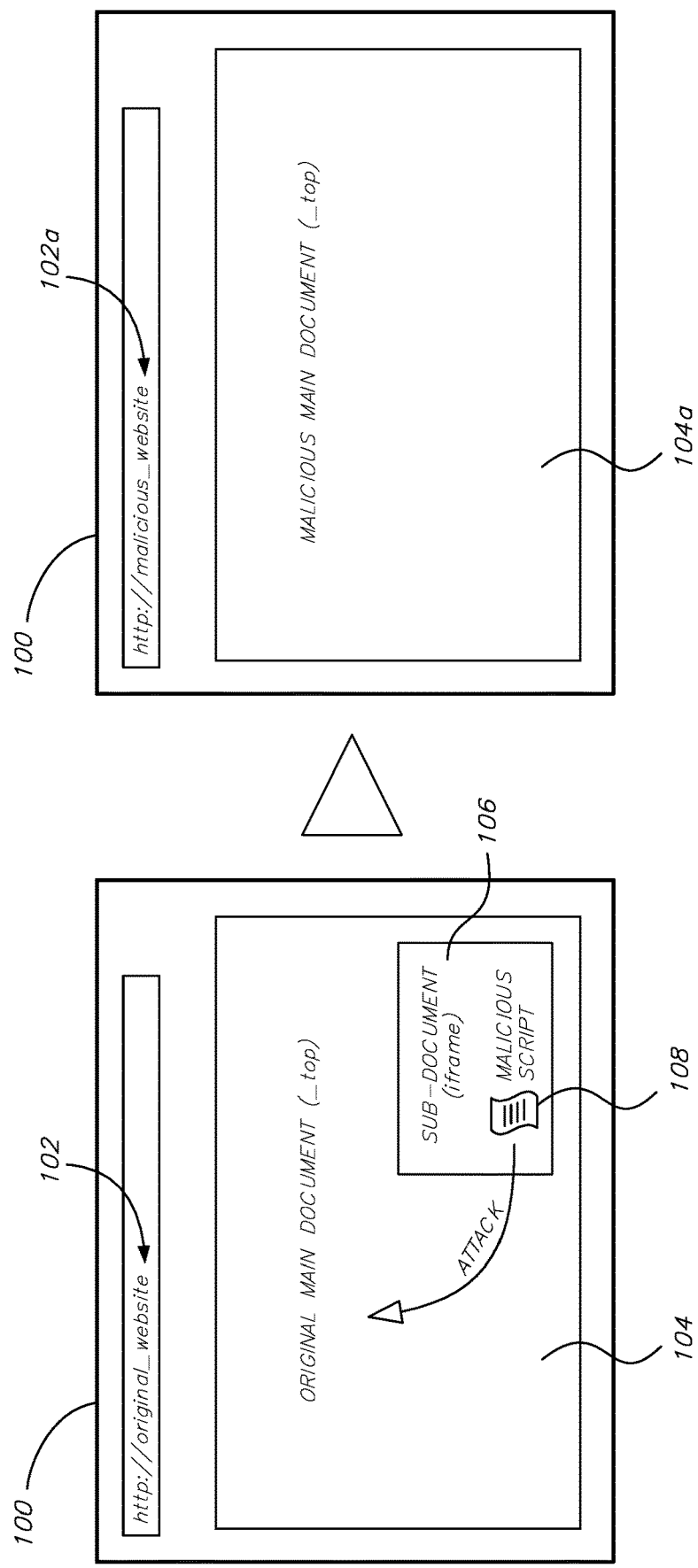
FIG. 1 shows a schematic illustration of an attack originating in a sub-document nested in a main document.

Nested sub-documents, such as iframes, are often used for serving content ancillary to the main document, such as advertisements. FIG. 1 shows such an exemplary configuration. On the left, a web browser 100 displays content received from a URL (Uniform Resource Locator) of an exemplary web site, http://original_website 102. Web site 102 occupies the entire main document area 104 of web browser 102. A sub-document 106, such as an iframe, is nested in main document 104.

The owner of web site 102 (e.g. a webmaster) typically implants suitable HTML and/or javascript code inside the main document, to create iframe 106 and call external content to populate the iframe. The call is often to an advertisement server (commonly referred to as an "ad server"), which decides which advertisement to transmit to that iframe 106 on a case-by-case basis.

This makes iframe 106 prone to external attacks. A malicious advertiser, who wishes to expose visitors of main document 104 to contents beyond the bounds of iframe 106, may implant a malicious script 108 (e.g., javascript) in the content delivered from the ad server to iframe 106, to run the following attack: when this script is executed, it causes web browser 100 to navigate away from the main document 104, for example to http://malicious_website 102a (see right side of the figure), thus presenting to the visitor a malicious main document 104a that replaces original main document 104. This attack exceeds the scope of what iframes were intended to be capable of performing. Naturally, iframes are designed to be a closed environment, that is not able to affect anything beyond it. However, clever attacks are now able to escape that closed environment and navigate the main document.

The present technique is capable of detecting such attacks, by monitoring activity in the iframe which has the ability to affect the web browser at the main document level, and navigate it to a different URL. Optionally, the present technique also prevents such attacks once they are detected.

Figure 2:
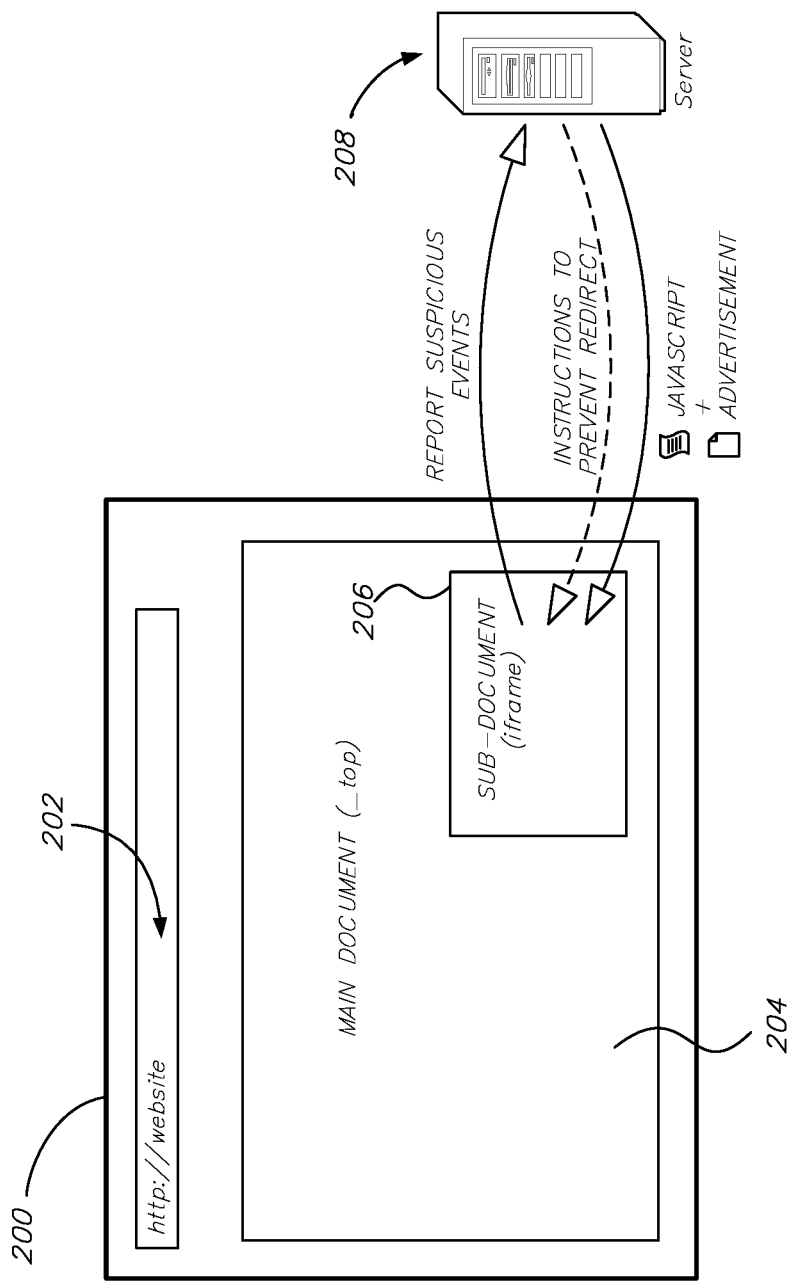
FIG. 2 shows a schematic illustration of a configuration to detect and optionally prevent redirection of a web browser away from a currently-displayed main document.

Reference is now made to FIG. 2, which shows an exemplary configuration of the present technique. A web browser 200 presents an exemplary website http://website 202. A main document 204 includes a sub-document, such as an iframe 206. A server 208, which may be an ad server, is used to deliver an advertisement into iframe 206. At this point, it is not yet known whether the advertisement includes malicious code hiding inside its HTML content. Server 208 delivers into iframe 206, together with the advertisement, also a client-side code, such as a javascript, that implements the present technique. That javascript executes in web browser 200, and monitors occurrences in iframe 206, such as actions that are triggered by contents, malicious or not, of the advertisement. If an event suspicious to be malicious is detected, then the javascript code may either report the event to server 208, or prevent the attack immediately. If the event is reported to server 208, then the server may decide whether to prevent or allow the event, and transmit an instruction back to the javascript code to prevent or allow the event.

Figure 3:
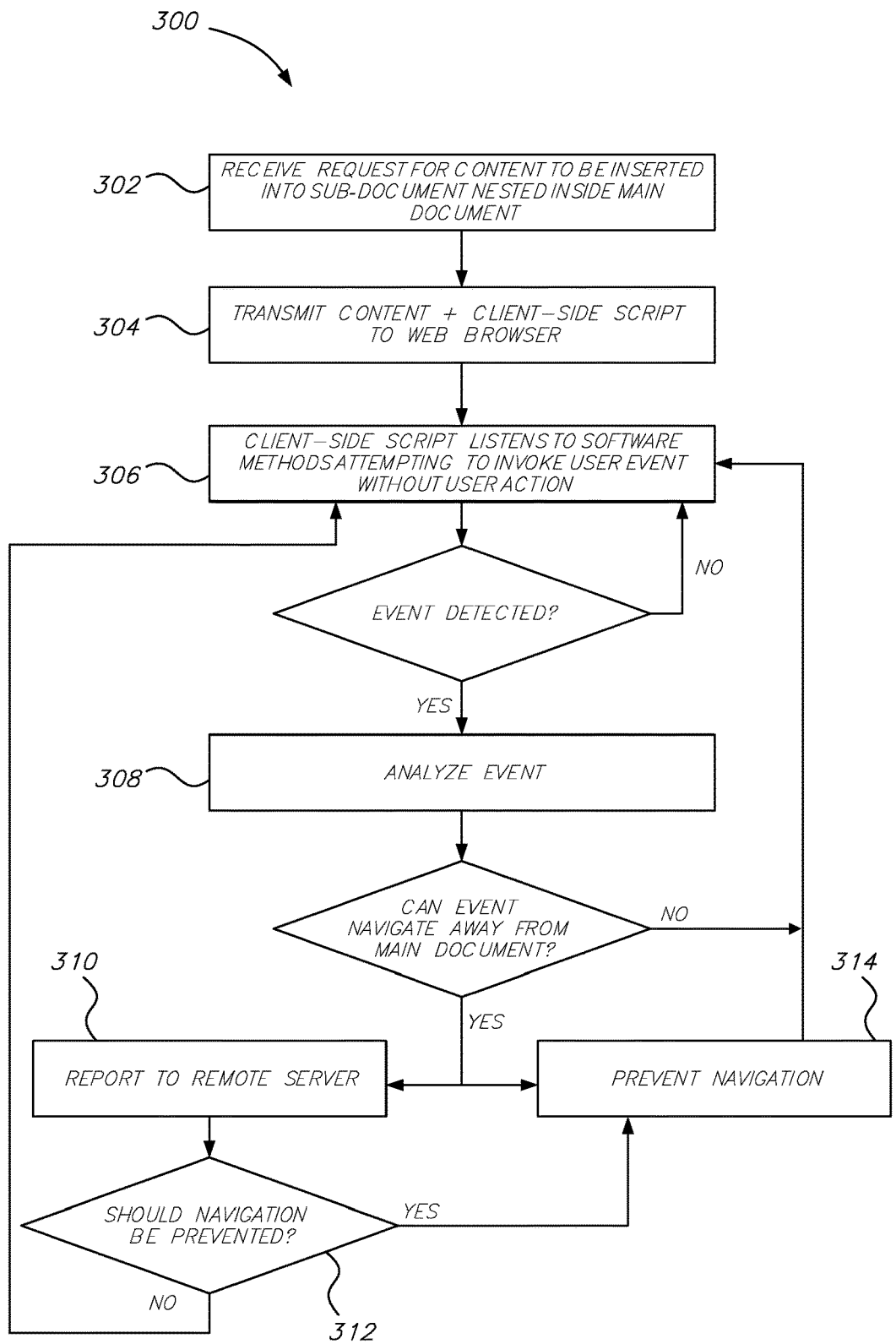
FIG. 3 shows of a flow chart of a method to detect and optionally prevent redirection of a web browser away from a currently-displayed main document.

Reference is now made to FIG. 3, which shows a flow chart of a method 300 for detecting, and optionally preventing, attempts to redirect a web browser. Method 300 describes the preceding discussions in further detail.

Method 300 is applicable in a scenario where a main document, e.g., an HTML web page, includes a nested sub-document, e.g., an iframe; and the iframe is set to call externally-hosted content, such as an advertisement, to be displayed inside it. For example, the main document may define the iframe as follows:

<iframe src="http://adserver"></iframe>, where adserver is the URL of where the contents are fetched from.

Alternatively, an iframe may be instantiated from a suitable javascript and/or HTML code snippet embedded in a desired location in the HTML web page. For example, the following is a sample code commonly used to embed Google Adwords™ advertisements in web pages:

```
<script async src="//pagead2.googlesyndication.com/pagead/js/adsbygoogle.js">
</script>
<!-- Homepage Leaderboard -->
<ins class="adsbygoogle"
style="display:inline-block;width:728px;height:90px"
data-ad-client="ca-pub-1234567890123456"
data-ad-slot="1234567890"></ins>
<script>
(adsbygoogle = window.adsbygoogle || [ ]).push({ });
</script>
```

In effect, that sample code creates an iframe and calls suitable external content to populate it.

Method 300 assumes that the webmaster had implemented suitable code in its web page to instantiate an iframe and call external content to populate it. However, in this case, the call is to a server that is configured to operate in accordance with the present technique, as follows:

In a step 302, the server receives, from a web browser, a request for content to be inserted into a sub-document that is nested inside a main document (the web page, regarded by the web browser as the "_top" document).

In a step 304, the server transmits to the web browser, in response to the request: first, the requested content, which may include, for example, HTML and/or javascript code. If the content is an honest advertisement, then the HTML and/or javascript code will cause the web browser to display text and/or graphics inside the iframe. If the content is malicious, then it may include malicious HTML and/or javascript code, with or without a real advertisement. Second, in addition to transmitting the requested content from the server to the web browser, the server also transmits a client-side script (such as a javascript) that, when inserted by the web browser into the iframe: listens 306 to software methods that attempt to invoke a user event without an action by a user of the web browser; and analyzes 308 the user event to determine if the user event is configured to cause said web browser to navigate away from the main document.

The following code, which combines HTML and javascript, is an example of a redirection attack which may accompany seemingly-innocent content received from the server. Annotations are shown with a preceding double slash:

```
<html>
<body>
<script>
var target = 'https://www.ynet.co.il'; // This variable contains the URL to which the redirection will be made.
function redirect(e) {
        if (e == 'link') { // A first scenario, attempting to redirect by a simulated click on a link.
                var f = document.createElement('a'); // Creates a link that will later be subjected to a simulated user click.
                f.target = '_top'; // Instructs the browser that the link will be opened in the '_top ' document.
                f.href = target;
                document.body.appendChild(f); // Adds object "f", which includes the link and its target, to the present document (displayed in an iframe).
                var g = document.createEvent('MouseEvent');
                g.initMouseEvent('click', !![ ], !![ ], window, 0x0, 0x0, 0x0, 0x0, 0x0, ![ ], ![ ], ![ ], ![ ], 0x0, null); // Prepare a simulated click event.
                f.dispatchEvent(g); // Will trigger the simulated click event.
        } else if (e == 'form') { // A second scenario, to be activated in the first scenario fails. In this scenario, a form submission is simulated.
                var h = document.createElement('form'); // Creates a form that will later be subjected to a simulated from submission.
                h.target = "_top"; // Instructs the browser that the form will submit to the '_top ' document.
                h.action = target;
                h.method = 'GET';
                document.body.appendChild(h); // Adds object "h", which includes the form and its target, to the present document (displayed in the iframe).
                h.submit( ); // Will trigger the simulated form submission.
        }
};
setTimeout(function ( ) {
        redirect('link'); // Run the redirect function using the link method.
    },1);
setTimeout(function ( ) {
        redirect('form'); // Run the redirect function using the form method.
    },2000); // The function will be run after a 2-second delay.
</script>
</body>
</html>
```

The listening 306 by the client-side script is to synthetic events, masqueraded as events performed by the real user of the web browser ("user events"), because this type of events is capable of instructing the web browser to perform actions beyond the limited environment of the iframe.

The listening 306 may be performed, by the client-side script, by way of hooking to software methods (i.e. DOM methods) that have the aforementioned capability to synthesize user events. The hooking essentially intercepts events that are triggered by these software methods, such that we are able to inspect them before they reach execution.

The hooking may be, for example, to one or more of the following DOM methods: "HTMLElement.prototype. click", "EventTarget.prototype.dispatchEvent", "HTMLFormElement.prototype.submit", "Event( )" constructor, "fireEvent( )", "document.createEvent", "Event.initEvent ( )", "MouseEvent", and "UIEvent".

Once one of these hooks intercepts and detects an event, the following analysis 308 takes place: Is the intercepted event is a user event configured to cause the web browser to navigate away from the _top document? User events suspi- cious of that may be events such as "document.createEvent", "Event.initEvent", use of an "Event( )" constructor to create a new event, and/or a registration of a new event listener (such as "EventTarget.addEventListener", "attachEvent( )", or "captureEvents( )").

The method to analyze 308 the intercepted user event and determine if it is configured to navigate away from the top document may differ, based on the nature of the DOM method. The following exemplary javascript codes show both the hooks and the analyses made to determined if the intercepted user events can navigate away from the top document:

In the case of the DOM method being "HTMLElement. prototype.click" the following exemplary javascript code may be used:

```
 1:    _click = HTMLAElement.protoype.click;
 2:    HTMLElement.prototype.click = function ( ) {
 3:        if (this.target === '_top') {
 4:            reportRedirect({
 5:                target: this.href;
 6:            });
 7:        } else {
 8:            return _click.call(this);
 9:        }
10: }
```

In line 1 of the code, the original HTMLAElementpro- toype.click function that was called by the potentially mali- cious code is saved to a variable called "_click", for later use.

In line 2, the HTMLAElementprotoype.click is hooked to. When the potentially malicious code attempt to invoke that DOM event, the function in lines 3-10 will first execute, while the original invocation is placed on hold.

In line 3, the code checks if the target the HTMLAElementprotoype.click is the _top document. If it is, then line 4 may report that redirection attempt to a remote server 310. The report may include, for example, the URL which the potentially malicious code attempted to navigate to, as line 5 shows. The server may then determine 312 whether the navigation should be prevented or allowed to proceed. For example, the server may compare the target URL of the redirection attempt against a black list and/or a white list of URLs. As another example, the server may instruct to block any and all redirection attempts, regardless of the target URL. If the server decides not to prevent the redirection, then line 8 may execute, fetching the contents of the original HTMLAElementprotoype.click from the saved "_click" variable, and allowing it to execute. Then, method 300 returns to the listening stage 306 and continues monitoring future events. If the server decides to prevent the redirection, then line 8 may be skipped, which will not release the previous-set hook and effectively prevent the navigation 314 (note that the above exemplary code does not show, for reasons of brevity, the exact mechanism of communicating with the remote server, receiving its instructions and executing them).

In the case of the DOM method being "EventTarget.prototype.dispatchEvent" the following exemplary javascript code may be used:

```
1:    _dispatchEvent = EventTarget.prototype.dispatchEvent;
2:    EventTarget.prototype.dispatchEvent = function (event) {
3:         var isClick = event.type === 'click';
4:         var isTopNav = event.target.target === '_top';
5:         var url = event.target.href || event.target.action;
6:         if (isClick && isTopNav) {
7:              reportRedirect({
8:                   target: url
9:              });
10:        } else {
11:             _dispatchEvent.apply(this, arguments);
12:        }
13:   };
```

In line 1 of the code, the original EventTarget.prototype.dispatchEvent function that was called by the potentially malicious code is saved to a variable called "_dispatchEvent", for later use.

In line 2, the EventTargetprototype.dispatchEvent is hooked and listened 306 to. When the potentially malicious code attempt to invoke that DOM event, the function in lines 3-13 will first execute, while the original invocation is placed on hold.

The analysis 308 is performed in lines 3-6:

In line 3, the code checks if the event type of EventTargetprototype.dispatchEvent is a click event, and stores "true" or "false" in a "isClick" variable.

In line 4, the code stores the redirection URL to a "url" variable, whether it originates in an "a" HTML tag or a "form" HTML tag.

In line 5, the code checks if the event is both a click, and targets the top document.

In lines 7 and 8, like in the previous code sample, the redirect attempt may be reported to a remote server. Line 11 allows the original EventTarget.prototype.dispatchEvent to execute, if a decision to allow this to happen has been reached.

In the case of the DOM method being "HTMLFormElement.prototype.submit" the following exemplary javascript code may be used:

```
1:    submit = HTMLFormElement.protoype.submit;
2:    HTMLFormElement.prototype.submit = function ( ) {
3:         if (this.target === '_top') {
4:              reportRedirect({
5:                   target: this.action;
6:              });
7:         } else {
8:              return _submit.call(this);
9:         }
10:   }
```

In line 1, reference to the original submit function is saved.

The function of line 2 will be called when a potentially-malicious scipts calls "a.click( )".

Line 3 checks whether the target of the form submission is the "_top" document.

Line 4 reports the redirection attempt to a remote server, if the check of line 3 was positive.

Line 5 includes, in the report, the target URL of the redirection attack.

Line 8, executed if the target was not the "_top" document, allows the form to submit normally and without any intervention.

Note that, in method 300, the preventing of the navigation 314 need not necessarily be decided by the server. It is optional to simply allow the client-side code to prevent navigation 314 immediately upon detecting that the event can navigate the main document. The report to the server may be carried out, for example, if it is desired to let the server run a more thorough check first, or to simply log the occurrence.

In the above examples, the URL to which the malicious code attempts to redirect may sometimes be obfuscated to avoid detection. For example, the author of the malicious code may encode the target URL in such a way to fail any attempt to match it against a black list of URLs. For instance, the URL google.com may be encoded as "//%77%77%77%2E%67%6F%6F%67%6C%65%2E%63%6F%6D". While this means nothing to an unsuspecting observer, the web browser, when decoding the string, will navigate to google.com. Accordingly, method 300 optionally uses the web browser's own parser to first decode the target for the redirection, before transmitting it to the remote server and/or comparing it against a black list or a white list.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   executing, by a web browser that presents a main document and a sub-document nested inside said main document, a client-side script that resides in said sub-document, to:
   (i) listen to software methods that attempt to invoke a user event without an action by a user of said web browser, and (ii) analyze said user event to determine if said user event is configured to cause said web browser to present another main document that replaces said presented main document.

2. The method according to claim 1, wherein:
each of said main document and said sub-document is an HTML (HyperText Markup Language) web page, and said sub-document is nested inside an iframe of said main document.

3. The method according to claim 1, wherein:
said main document is regarded by said web browser as a "_top" document, and the presentation of said another main document that replaces said presented main document comprises said user event instructing said web browser to navigate to a URL (Uniform Resource Locator) that is different from a URL currently presented as the "_top" document.

4. The method according to claim 3, wherein said software methods are selected from the group consisting of:
"HTMLElement.prototype.click";
"EventTarget.prototype.dispatchEvent";
"HTMLFormElement.prototype.submit";
an "Event( ) constructor";
"fireEvent( )";
"document.createEvent";
"Event.initEvent( )";
"MouseEvent"; and
"UIEvent".

5. The method according to claim 3, wherein said user event is determined to be configured to cause said web browser to navigate away from said main document, if said user event is of the group consisting of:
"document.createEvent";
"Event.initEvent"; and
use of an "Event( )" constructor to create a new event.

6. The method according to claim 3, wherein said user event is determined to be configured to cause said web browser to navigate away from said main document, if:
said user event comprises a registration of a new event listener.

7. The method according to claim 6, wherein said new event listener is selected from the group consisting of:
"EventTarget.addEventListener";
"attachEvent( )"; and
"captureEvents( )".

8. The method according to claim 3, wherein the client-side script is a javascript.

9. The method according to claim 3, further comprising, in response to a determination that said user event is configured to cause said web browser to navigate away from said main document:
preventing, by said client-side script, said user event from causing said web browser to navigate away from said main document.

10. The method according to claim 9, wherein said client-side script further transmits said determination to a server, and receives an instruction from the server to perform said preventing.

11. A system comprising:
at least one hardware processor; and
a non-transient computer-readable storage medium having program code embodied therewith, the program code executable by said at least one hardware processor to:
execute, by a web browser that presents a main document and a sub-document nested inside said main document, a client-side script that resides in said sub-document, to:
(i) listen to software methods that attempt to invoke a user event without an action by a user of said web browser, and
(ii) analyze said user event to determine if said user event is configured to cause said web browser to present another main document that replaces said presented main document.

12. The system according to claim 11, wherein:
each of said main document and said sub-document is an HTML (HyperText Markup Language) web page, and said sub-document is nested inside an iframe of said main document.

13. The system according to claim 11, wherein:
said main document is regarded by said web browser as a "_top" document, and the presentation of said another main document that replaces said presented main document comprises said user event instructing said web browser to navigate to a URL (Uniform Resource Locator) that is different from the URL currently presented as the "_top" document.

14. The system according to claim 13, wherein said software methods are selected from the group consisting of:
"HTMLElement.prototype.click";
"EventTarget.prototype.dispatchEvent";
"HTMLFormElement.prototype.submit";
an "Event( ) constructor";
"fireEvent( )";
"document.createEvent";
"Event.initEvent( )";
"MouseEvent"; and
"UIEvent".

15. The system according to claim 13, wherein said user event is determined to be configured to cause said web browser to navigate away from said main document, if said user event is of the group consisting of:
"document.createEvent";
"Event.initEvent"; and
use of an "Event( )" constructor to create a new event.

16. The system according to claim 13, wherein said user event is determined to be configured to cause said web browser to navigate away from said main document, if:
said user event comprises a registration of a new event listener.

17. The system according to claim 16, wherein said new event listener is selected from the group consisting of:
"EventTarget.addEventListener";
"attachEvent( )"; and
"captureEvents( )".

18. The system according to claim 13, wherein the client-side script is a javascript.

19. The system according to claim 13, further comprising, in response to a determination that said user event is configured to cause said web browser to navigate away from said main document:
preventing, by said client-side script, said user event from causing said web browser to navigate away from said main document.

20. The system according to claim 19, wherein said client-side script further transmits said determination to a server, and receives an instruction from the server to perform said preventing.

21. A non-transient computer-readable storage medium having program code embodied therewith, the program code executable by at least one hardware processor to:
- execute, by a web browser that presents a main document and a sub-document nested inside said main document, a client-side script that resides in a said sub-document, to:
- (i) listen to software methods that attempt to invoke a user event without an action by a user of said web browser, and
- (ii) analyze said user event to determine if said user event is configured to cause said web browser to present another main document that replaces said presented main document.

* * * * *